(12) United States Patent
Polley

(10) Patent No.: US 7,192,631 B2
(45) Date of Patent: Mar. 20, 2007

(54) ERGONOMIC SURGICAL FLOORMAT

(75) Inventor: John W. Polley, River Forest, IL (US)

(73) Assignee: Ergotech Solutions, Inc., Elgin, IL (US)

( * ) Notice: Subject to any disclaimer, the term of this patent is extended or adjusted under 35 U.S.C. 154(b) by 643 days.

(21) Appl. No.: 09/973,298

(22) Filed: Oct. 9, 2001

(65) Prior Publication Data

US 2003/0068463 A1   Apr. 10, 2003

(51) Int. Cl.
  *B32B 3/00* (2006.01)
  *B32B 1/00* (2006.01)
  *B32B 3/12* (2006.01)
  *A47G 9/06* (2006.01)

(52) U.S. Cl. .................. 428/68; 428/71; 428/72; 428/40.1; 428/314.4; 428/178; 5/420

(58) Field of Classification Search .............. 428/68, 428/71, 72, 40.1, 314.4, 178, 172, 159, 316.6; 5/420; 15/215, 216
See application file for complete search history.

(56) References Cited

U.S. PATENT DOCUMENTS

| | | | |
|---|---|---|---|
| 2,843,868 A | 7/1958 | Borgstrom | |
| 3,083,393 A | 4/1963 | Nappi | |
| 3,846,945 A | 11/1974 | Roby | |
| 4,328,275 A | 5/1982 | Vargo | |
| 4,356,642 A * | 11/1982 | Herman | 36/44 |
| 4,574,101 A * | 3/1986 | Tricca et al. | 428/138 |
| 4,609,580 A | 9/1986 | Rockett et al. | |
| 4,614,679 A | 9/1986 | Farrington, Jr. et al. | |
| 4,644,592 A | 2/1987 | Small | |
| 4,822,669 A | 4/1989 | Roga | |
| 4,981,544 A | 1/1991 | Nordale | |
| 5,028,468 A | 7/1991 | Taylor | |
| 5,173,346 A | 12/1992 | Middleton | |
| 5,236,753 A | 8/1993 | Gaggero et al. | |
| 5,274,846 A * | 1/1994 | Kolsky | 2/460 |
| 5,383,570 A | 1/1995 | Gordon | |
| 6,022,617 A * | 2/2000 | Calkins | 428/354 |

OTHER PUBLICATIONS

Sealed Air Corporation, Company History, downloaded Sep. 23, 2001, www.sealedair.com, pp. 1-8.

(Continued)

*Primary Examiner*—Harold Pyon
*Assistant Examiner*—Catherine A. Simone
(74) *Attorney, Agent, or Firm*—Butzel Long

(57) ABSTRACT

An ergonomic floormat has particular utility as a surgical mat to decrease musculoskeletal fatigue in humans during prolonged static postural stress, as occurs during standing. The floormat is uniquely designed in a laminated fashion, utilizing bubble shaped closed cellular materials, closed cellular polyethylene foam materials and/or closed cellular polypropylene foam materials. The unique design allows an ergonomically, non-compressible mat, which offers high support and high Indent Force Deflection. The mat is designed for single use only and is completely disposable. The mat is water repellant and anti-static, and can include an anti-skid bottom surface of a low-tack, adhesive material to allow for greater securement to the surgical floor and to prevent slippage. While the floormat is designed with particular application for the operating theatre, it may find use in consumer and industrial situations as well, where a disposable mat is desired for maximum ergonomic and anti-fatigue properties.

18 Claims, 2 Drawing Sheets

OTHER PUBLICATIONS

Sealed Air Corporation, Sealed Air Corporation Introduces Cellu-Cushion® —NS Polyethylene Foam, downloaded Sep. 23, 2001, www.sealedair.com, pp. 1-2.

Scott Williams, Ethafoam and Other Polyethylene Foams in Conservation, downloaded Sep. 23, 2001, http://palimpsest.stanford.edu/byauth/williams/foam.html. pp. 1-4.

Sealed Air Corporation, Air Cap® Barrier-Sealed Bubble Packaging, downloaded Sep. 23, 2001 from www.sealedair.com, 8 pages.

Knox & Schneider Incorporated, Products, downloaded Sep. 23, 2001, www.knoxandschneider.com, pp. 1-3.

Marfred Industries, Astro-Bubble, downloaded Sep. 23, 2001, www.marfred.com, pp. 1-3.

Cleansweep Supply Inc., MicroFoam® Packaging Material, downloaded Sep. 23, 2001, 1 page.

* cited by examiner

ERGONOMIC SURGICAL FLOORMAT

BACKGROUND AND SUMMARY OF THE INVENTION

The present invention relates generally to floormats and, more particularly, to an ergonomic, disposable, anti-fatigue floormat. Among other applications, this invention is directed to improving ergonomics in surgery or other human tasks that require prolonged static postural positioning such as standing in one location for prolonged periods. Specifically, mats of the present invention are designed to allow surgeons performing open surgical procedures, a method of significantly decreasing musculoskeletal workloads and long-term musculoskeletal fatigue during such surgical procedures.

It has been well documented through medical ergonomic studies that healthcare professionals who spend a significant amount of time in a static posture experience substantial stress to the musculoskeletal system. This stress is directly related to lower extremity fatigue with concurrent effects extending up the human body through the lower extremities, lumbar region, head and neck region, as well as shoulders and upper extremities. This static postural stress related fatigue phenomenon has been well documented by surgeons, dentists, as well as in nursing healthcare professionals who are assisting as part of the operative team.

Numerous types of floormats have been described for commercial, and industrial uses. Mats have also been designed specifically for use in the operating room. Most all prior mat descriptions, however, have been for floor protection and/or to allow absorption of fluids. For example, U.S. Pat. No. 5,028,468 is directed towards a permanent surgical mat with a disposable covering. The permanent floormat described is a polyvinyl chloride foam mat, which is compressible. The outer disposable cover of the permanent mat is suggested to be polyethylene or other similar type polyester material, which then seals around the main nondisposable mat. Anti-static and/or anti-microbial solutions can be injected into this permanent mat. Despite the outer covering which is disposable, the permanent mat must be cleaned in accordance to HCFA (Health Care Finance Administration) and JCAHO (Joint Commission on Accreditation of Health Care Organizations) requirements creating a difficult situation. In addition, the polyvinyl chloride foam is a compressible material and offers limited ergonomic advantages. This has been demonstrated through the work of Cook (Journal Biomedical Engineering 1993, Volume 15, pp 247) through EMG studies.

U.S. Pat. No. 5,173,346 describes a foldable sponge mat for surgical application. This mat was designed specifically for absorbing fluids from the operating room floor. This mat is composed of a cellulose-based material to allow for fluid absorption and was not designed for ergonomic properties. The mat was designed for permanent use. However, the mat apparently must be discarded following its expansion with the absorption of fluids.

U.S. Pat. No. 4,609,580 discloses another absorbent floormat not designed specifically for operating room use. Its applications were described for building entryways, laboratories, and hospitals where there is high traffic area likely to bring in water, dirt, and other contaminates. This disposable mat is not ergonomically designed.

Mats designed in ergonomic fashion for musculoskeletal relief have been described for the industrial setting. For example, U.S. Pat. No. 3,846,945 describes an anti-fatigue floormat composed of heavy rubber or plastic with interdigitating tongues around its perimeter allowing an interlocking connection with other mats for extended configurations. These are heavy duty, perforated permanent mats, which, due to problems with handling and sterility, are not applicable to the operating room environment.

Accordingly, there is a need for an ergonomically designed, completely disposable mat that specifically reduces musculoskeletal fatigue associated with prolonged static posturing such as those experienced during open operative procedures.

It is therefore an object of the present invention to provide an ergonomic floormat.

It is another object of the present invention to provide an ergonomically designed surgical floormat whose purpose is to decrease musculoskeletal fatigue in human beings during prolonged static postural stress.

It is another object of the present invention to provide a surgical floormat intended for disposal use.

The present invention accomplishes these and other objects by providing a surgical mat offering significant ergonomic, musculoskeletal stress relief for, among others, surgeons, dentists and nursing healthcare professionals who are assisting as part of the operative team. In accordance with one aspect of the invention a noncompressible floormat system was designed utilizing a laminated construction of polyethylene and polypropylene closed cellular foam and bubble materials. This noncompressive floormat design allows specific anti-fatigue factors through dispersive noncompressive forces.

In another aspect of the present invention, the mats can also include more commonly recognized properties such as being anti-static which is an important feature when the mat is employed during use with electronic equipment. Additionally, mats of the present invention also can include anti-slip or skid properties such as by employing a low-tack adhesive material on the surface of the mat. This mat is also completely disposable and designed for one-time use only. While designed for the operating theatre, this mat may find application for commercial or private use as well.

In yet another preferred aspect of the invention, a surgical floormat is provided having a preferred embodiment of layer(s) of a non-foam, air bubble-shaped, closed cellular material which significantly increases the Indent Force Deflection (IFD) properties of the mat, maximizing its anti-fatigue characteristics.

In another preferred aspect of the invention, the surgical floormat comprises layer(s) of polypropylene foam with anti-static characteristics.

In another preferred aspect of the invention, a surgical floormat is provided which utilizes a polypropylene thin foam material as a covering to allow a high coefficient of friction. The properties of this material offer a slip resistant surface that is readily moldable, is heat resistant, and is able to accept printing and labels for informational data.

In yet another preferred aspect of the invention, the mat may be constructed by centering smaller layers on top of larger layers to create a gradual elevation (pyramiding effect) allowing for a beveled perimeter which reduces the potential tripping hazard associated with walking and working on a slightly elevated work space.

In yet another preferred aspect of the invention, the mat has an adhesive bottom layer for temporary positioning and repositioning of the mat reducing the potential for tripping and slippage during its use.

It will be appreciated by those skilled in the art that the materials of the preferred embodiments disclosed can be used in combination and in different quantities and orientation to allow for an ergonomically fatigue reducing mat for use in the operating theatre and that the mats of the present invention are not restricted to that use. For example, mats of the present invention, may also find wide application in the private commercial industrial setting where musculoskeletal relief from fatigue created by prolonged static postural stress can occur.

The present invention is designed to improve medical ergonomic stress patterns in, among other places, the operating theatre. A noncompressible surgical floormat with a high Indent Load Defection (ILD) has been designed, consisting of multiple layers of alternating laminated materials, including layers of noncompressible polyethylene and polypropylene close cellular foam and bubble materials, to prevent complete compression while being stood upon by human beings. This mat has been designed to reduce the well documented occupational hazards for healthcare professionals while performing open surgical procedures as well as other medical and dental forms of patient care. These health risks are due to prolonged standing and awkward body positions secondary to static postural stress, which leads to significant musculoskeletal fatigue.

In addition, in a preferred embodiment, the surgical mat is specifically designed for use in the operating theatre and to be totally disposable. The materials and construction of the mat have been selected for their ergonomic efficiency as well as their relatively low costs to allow for usage in a disposable fashion. The disposability of the mat after a single use eliminates the problems associated with permanent-type surgical floormats, assuring elimination of contamination from one case to the next as well as assuring all JCHAO and HFCA operating room requirements. This mat is also designed in such a way to be anti-static, to allow its use around electrical equipment commonly employed in the operating room setting. The floormat can also have a tapered, beveled perimeter edge so that the mat cannot be easily kicked or scuffed to minimize tripping. A beveled perimeter edge also facilitates moving equipment over the mat, if necessary, although rolling equipment over the mat is not recommended. In addition, the bottom surface of the mat can have a low-tack adhesive material covering part or the entirety of the base, which allows for further adherence to a room floor such as an operating room floor. The invention can be simply disposed of with all other contaminated objects by the nursing staff at the conclusion of each case.

Preferably the mat is water-resistant and is not designed for absorbing bodily fluids or irrigants from the floor per se. While this anti-fatigue surgical floormat was designed for use by healthcare professionals in the operating theatre, its ergonomic characteristics may find applications in other private and/or commercial settings as well. This floormat may come in a variety of sizes and/or shapes to accommodate various surgical operating rooms or other environments.

BRIEF DESCRIPTION OF THE DRAWINGS

So that the preferred functions and description of the above mentioned invention are more fully understood and so that it is apparent to those knowledgeable of these uses and materials of the invention, specific illustrations of the invention are referenced and offering an additional ability to further understand the embodiments. These drawings are of various views of the invention and represent, in part, the components and structure. It will be appreciated by those skilled in the art that the following description is exemplary and other equally usable and capable materials, constructions and embodiments will be apparent, even though they may not be shown. Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

FIG. 3 also illustrates the preferred "pyramiding" effect for one edge of a mat constructed in accordance with a preferred embodiment, wherein the top layer covers each exposed lower lay. Pyramiding, however, is optional.

DETAILED DESCRIPTION OF THE INVENTION

Figure 1:
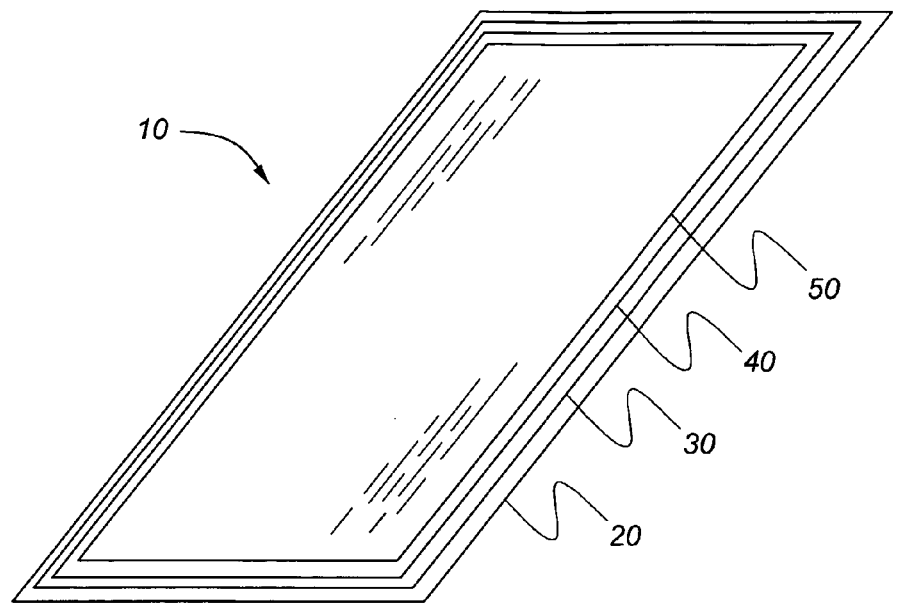
FIG. 1 is a perspective overview of a floormat of the present invention that represents the overall shape of one of the embodiments of the invention.

The above described drawings illustrate a visual understanding of the preferred embodiments, preferred positioning and preferred materials of the invention. These drawings, while not to scale, do depict a dimensional view of preferred embodiments of the invention e.g., a preferred depth and style of invention, FIG. 1; a top view of a preferred placement and shape of layers, FIG. 2; a cross-sectional view depicting the preferred embodiments and layers, FIG. 3; and a complete cross-sectional view depicting further embodiments of the invention in their preferred positions, FIG. 4.

Preferred materials for mats of the present invention include those made of anti-static air cellular "bubble" shaped polyethylene based material, anti-static closed cellular polyethylene based foam material, and anti-static closed cellular polypropylene based foam material. These materials are utilized in a variety of layered constructions. A preferred laminating material 80, 82, 84 and 86 is utilized to bond the various layers together and a preferred low tack adhesive material 28 with a carrier sheet 26 form a laminated construction to create the first layer 20. The preferred low tack adhesive material has a removable liner (preferably a silicon coated paper) 29 so that the liner 29 can be easily removed and discarded before use and the floormat can be temporarily affixed to a typical flooring surface. The preferred material also allows for repositioning prior to use.

FIG. 1 illustrates, dimensionally, a generally rectangular floormat 10 (topside visible) and the possible "pyramiding" effect of the layering construction which provides a truncated pyramidal shape to the mat. As best illustrated in FIG. 1 and FIG. 2, the mat comprises several layers and starting with the base layer 20 each successive layer 30, 40, 50, is centered one layer on top of another to give a gradual elevation and create a symmetrical appearance on the length and width of the mat.

Figure 2:
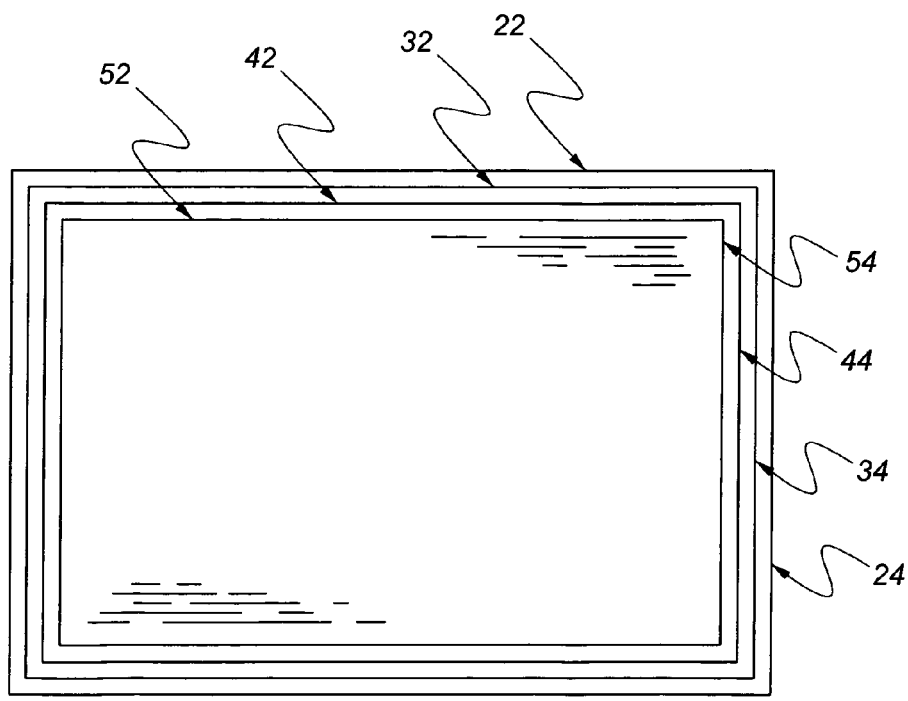
FIG. 2 is a top view of the floormat shown in FIG. 1 which shows, but is not limited to, the preferred positioning of each structural layer of the mat and the preferred "pyramiding" effect of the layers.
Figure 3:
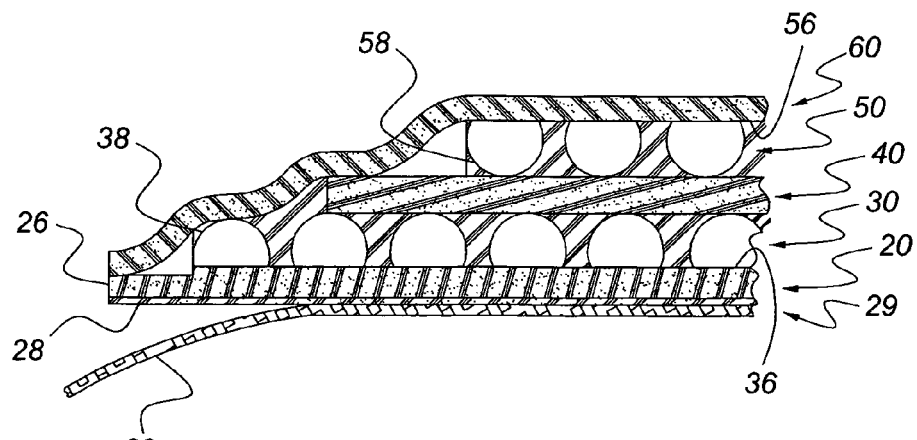
FIG. 3 is a magnified partial cross-sectional view of a preferred embodiment and depicts a preferred layering construction.
Figure 4:
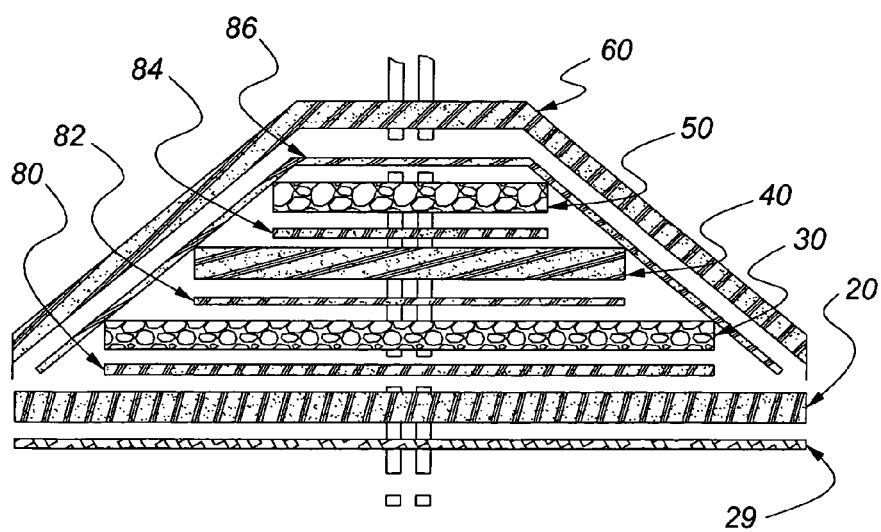
FIG. 4 is a magnified, exploded cross-sectional view of a preferred embodiment showing the preferred positioning within the layering construction and the preferred adhesive layers that attaches each layer to the preferred adjoining layers.

As best shown in FIG. 1 and FIG. 2, this preferred "pyramid" effect begins with the "floor side," base layer 20, shown as having an overall rectangular shape, with a length 22 and width 24 of the finished mat. Layers 30, 40, and 50, preferably decrease in overall length and width in each direction with respect to those of layer 20, e.g. layer 30 has a length 32 and a width 34, each of which is respectively dimensionally less than 22 and 24, layer 40 has a length 42 and a width 44, each of which is respectively less than 32 and 34, and layer 50 has a length 52 and a width 54, each of which is respectively dimensionally less than 42 and 44. As best shown in FIG. 3 and FIG. 4, mat 10 has a top, cover layer 60 affixed to the next layer 50 thereunder and cover layer 60 is also preferably affixed to all subsequent lower exposed layers to appear to be "shaped" to these layers and to totally cover the complete top side of the mat.

Mats of the present invention can, of course, be constructed in different sequences, eliminating or adding layers of the preferred embodiments shown and describe herein for different performance results and costing advantages. It will also be appreciated that mats of the present invention also can be of any desired shape. For example, in addition to a rectangular shaped construction, mats can be of an oval construction, a circular construction, a hexagonal construction, an octahedral construction, etc., to name but a few other shapes.

Turning to FIG. 4, base layer 20 comprises an adhesive material that is a low-tack adhesive with preferred adhesive ranges of from about 5 to about 100 ounces per inch of width (nominal), based on ASTM testing method (of adhesion to steel). Preferably base 20 is constructed from a polyethylene or co-extruded polymer as a carrier sheet 26 having a thickness of about 0.002 to about 0.004 inches to which the low-tack adhesive 28 is attached. Carrier sheet 26 provides mat 10 with added durability during its limited use and also acts as a carrier for the low tack adhesive 28. The adhesive material 28 and carrier sheet 26, are protected by a removable liner sheet 29. This removable liner sheet 29 is preferably a silicone coated paper, for example 25# to 40# basis weight or other adequate material which either inherently provides or is nominally coated enough for a clean release from low tack adhesive 28 while still able to remain on the adhesive prior to use.

Liner sheet 29 can be easily removed prior to use and is used to protect the adhesive layer 20 during fabrication, storage and shipping. The liner sheet 29 can be perforated, secured or otherwise constructed to facilitate removal of the liner sheet item desired.

Layer 30 is preferably comprised of a material that is an air "bubble" shaped closed cellular material with an inner air protection polymer barrier (preferred nylon or co-extruded polymer) layer to minimize the loss of air from the air cell. More preferably layer 30 has anti-static properties. The preferred material is manufactured from, or to have, about a 0.002–0.003 inch thickness for the "flat" side 36 of the bubble material (bottom overall sheet thickness) and about a 0.004–0.005 inch thickness for the "bubble" side 38 of the bubble material (top overall sheet thickness). Other thicknesses of this air "bubble" cellular material may be employed as well. In the preferred construction of mat 10, bubble side 32 is positioned upward to face the bottom of layer 40. The air "bubble" shaped cellular material comprising layer 30 preferably has less than a 10% thickness loss, based on a 0.5 pounds per square inch loading over 15 days utilizing a static test method of 10"×10" material samples. Commercially available air "bubble" shaped cellular materials useful in the present invention include those offered by Sealed Air Corp. under the trademarks, Bubble Wrap, Air Cap, Poly Cap, Poly Cap Lite and Bubble Mask; those offered by Pactiv (formerly Astro-Valcour) under the trademarks, AstroSupra-Bubble, Astro-Cell and Astro-Cell Plus; and those offered by Poly Air under the trademark Dura Bubble.

As shown in FIG. 4, mat 10 includes a laminating adhesive 80 to affix layer 20 to layer 30. The preferred adhesive 80 is a synthetic elastomer, 22–24% solids, with adhesion to the polymer substrates of 2–10 pounds per inch, based on ASTM test methods for adhesives. The preferred method of construction is to apply the laminating adhesive 80 to both the top of layer 20 and the bottom of layer 30 for proper bonding. Additional laminating techniques may be used such as, by way of example and not limitation, heat bonding of the polymer layers and utilizing laminating polymers to bond layers 20 and 30 together. In an alternative embodiment of the invention, low-tack adhesive 28 can be applied directly to the bottom of layer 30 without the use of carrier sheet 26. In yet another alternative embodiment of the invention, layer 20 can be eliminated and or replaced with anti-static friction inducing ribs, nubs or the like to impede movement of mat 10 when in use.

Layer 40 is preferably comprised of a material that is closed cellular polyethylene foam with a preferred nominal density of about 1.7 to 2.2 pounds per cubic foot and a preferred nominal thickness of about 0.125 inches. More preferably the closed cellular polyethylene foam of layer 40 has anti-static properties and the anti-static surface resistivity properties would preferably have less than $10^{13}$ OHMS/Square at 73° F., 15% R.H. based on testing method ASTM-D-257 and static decay properties of a maximum of 2 seconds under testing Method 4046 of Fed. Test Method STD 101C. Commercially available closed cellular polyethylene foam materials useful in the present invention include those offered by Sealed Air under the trademarks Cellu Cushion, Cellu Plank and Cell Aire; those offered by Pactiv under the trademarks Astro foam and Stratocel; and those offered by Poly Air under the trademark Star foam.

Preferably a laminating adhesive 82 is used to affix layer 30 to layer 40 in a similar manner as adhesive 80 secures layer 20 to layer 30. Preferably adhesive 82, similar to adhesive 80, is a synthetic elastomer, 22–24% solids, with adhesion to the polymer substrates of 2–10 pounds per inch, based on ASTM test methods for adhesives. The preferred method of construction is to apply laminating adhesive 82 to the top of layer 30 and the bottom of layer 40 for proper bonding. Additional laminating techniques may be used such as, by way of example and not limitation, heat bonding of the polymer layers and utilizing laminating polymers to bond layers 30 and 40 together.

Layer 50 is preferably comprised of an air "bubble" shaped closed cellular material with an inner air protection polymer barrier (preferred nylon or co-extruded polymer) layer to minimize the loss of air from the air cell. More preferably layer 50 has anti-static properties. Layer 50 is similar to layer 30. As for layer 30, the preferred material for layer 50 is manufactured from, or to have, about a 0.002–0.003 inch thickness for the "flat" side 56 of the bubble material (bottom overall sheet thickness) and about a 0.004–0.005 inch thickness for the "bubble" side 58 of the bubble material (top overall sheet thickness). Other thicknesses of this air "bubble" cellular material may be employed as well. In the preferred construction of mat 10, bubble side 58 is positioned downward to face the top of layer 50. This air "bubble" shaped cellular material would preferably have less than 10% thickness loss, based on a 0.5 pounds per square inch loading over 15 days utilizing a static test method of 10"×10" material sample.

Mat 10 also preferably includes a laminating adhesive 84 to affix layer 40 to layer 50 in a manner similar to the use of adhesive 82 to secure layers 30 and 40, and adhesive 80 to secure layers 20 and 30. Preferably adhesive 84, similar to adhesive 80 and 82, is a synthetic elastomer, 22–24% solids, with adhesion to the polymer substrates of 2–10 pounds per inch, based on ASTM test methods for adhesives. The preferred method of construction is to apply laminating adhesive to the top of layer 40 and to the bottom of layer 50 for proper bonding. Additional laminating techniques may be used such as, by way of example and not limitation, heat bonding of the polymer layers and utilizing laminating polymers to bond layers 40 and 50 together.

Mat 10 preferably includes a cover layer 60. Cover layer 60 is preferably comprised of an anti-static polypropylene closed cellular foam, with a preferred nominal density of about 0.5–0.7 pounds per cubic foot and a preferred nominal thickness of about 0.0625 inches. More preferably the material also exhibits a heat resistance of up to 310° F. (melting point) and has an inherent high coefficient of friction, offering a non-slip surface for the mat. The anti-static surface resistivity properties would preferably have less than $10^{13}$ OHMS/Square at 73° F., 15% R.H. based on testing method ASTM-D-257 and static decay properties of a maximum of 2 seconds under testing Method 4046 of Fed. Test Method STD 101C. Commercially available polypropylene closed cellular foam materials useful in the present invention include those offered by Pactiv under the trademark Microfoam.

As best shown in FIG. 3 and FIG. 4, cover layer 60 preferably not only covers layer 50 but also covers intermediate layers 40 and 30 and base layer 20, especially in the preferred embodiment where layers 50, 40 and 30, and optionally 20, are in a pyramid construction and provide mat 10 with one or more beveled edges.

Mat 10 also preferably includes a laminating adhesive to affix layer 60 to layer 50 and, were appropriate to layers 40, 30 and 20. Similar to adhesives 80, 82, and 84, adhesive 86 is preferably 60 a synthetic elastomer, 22–24% solids, with adhesion to the polymer substrates 2–10 pounds per inch, based on ASTM test methods for adhesives. In the preferred construction of mat 10, laminating adhesive 86 is applied to the bottom of cover 60 and to the top of and/or sides of the other surfaces facing cover 60 for proper bonding. Additional laminating techniques may be used such as, by way of example and not limitation, heat bonding of the polymer layers and utilizing laminating polymers to bond cover layer 60 to layer 50 and to other underlying surface sought to be covered.

While the preferred embodiments of the invention have been shown and described it will be apparent to those skilled in the art that changes and modifications may be made thereto without departing from the spirit of the invention. For example, variations in the number of layers, the thickness of one or more of the layers, proportion and properties of the materials of the layer, and overall design of the mat may vary without departing from the spirit of the invention, the scope of which is defined by the appended claims.

What is claimed is:

1. A mat for decreasing musculoskeletal fatigue in humans during prolonged static postural stress comprising:

a pair of bubble layers of an air bubble shaped closed cellular material, each said bubble layer having a flat side and a bubble side;

an intermediate layer selected from a group of materials consisting of closed cellular polyethylene foam material and closed cellular polypropylene foam material wherein said bubble sides of said bubble layers are positioned to face opposite sides of said intermediate layer;

a base layer including a low-tack adhesive bottom surface; and a cover layer of anti-static closed cellular polypropylene foam material wherein said bubble layers and said intermediate layer are positioned between said base layer and said cover layer.

2. The mat according to claim 1 wherein said bubble layers are formed from an anti-static air bubble shaped closed cellular material.

3. The mat according to claim 1 wherein said base layer comprises a polyethylene carrier sheet having an upper surface and a lower surface and said low-tack adhesive is carried on said lower surface of said carrier sheet.

4. The mat according to claim 3 including a removable liner releasably attached to said low-tack adhesive.

5. The mat according to claim 1 wherein said bubble layers, said intermediate layer, said base layer and said cover layer are adhered together by a laminating adhesive.

6. The mat according to claim 1 wherein said bubble layers and said intermediate layer are dimensioned to provide the mat with a truncated pyramidal shape having a beveled perimeter.

7. The mat according to claim 1 wherein said bubble shaped material has less than a 10% thickness loss based on a 0.5 pounds per square inch loading over 15 days utilizing a static test method of 10"×10" material samples.

8. The mat according to claim 1 wherein said closed cellular polyethylene foam material of said intermediate layer has a density in a range of 1.7 to 2.2 pounds per cubic foot.

9. The mat according to claim 1 wherein said polypropylene closed foam material of said cover layer has a density in a range of 0.5 to 0.7 pounds per cubic foot.

10. A mat for decreasing musculoskeletal fatigue in humans during prolonged static postural stress comprising:

a pair of bubble layers of an air bubble shaped closed cellular material, each said bubble layer having a flat side and a bubble side;

an intermediate layer of a closed cellular polyethylene foam material wherein said bubble sides of said bubble layers are positioned to face opposite sides of said intermediate layer, said closed cellular polyethylene foam material having a density in a range of 1.7 to 2.2 pounds per cubic foot;

a base layer including a low-tack adhesive bottom surface; and a cover layer of anti-static closed cellular polypropylene foam material having a density in a range of 0.5 to 0.7 pounds per cubic foot wherein said bubble layers and said intermediate layer are positioned between said base layer and said cover layer.

11. The mat according to claim 10 wherein said bubble layers are formed from an anti-static air bubble shaped closed cellular material.

12. The mat according to claim 10 wherein said base layer comprises a polyethylene carrier sheet having an upper surface and a lower surface and said low-tack adhesive is carried on said lower surface of said carrier sheet.

13. The mat according to claim 12 including a removable liner releasably attached to said low-tack adhesive.

14. The mat according to claim 10 wherein said bubble layers, said intermediate layer, said base layer and said cover layer are adhered together by a laminating adhesive.

15. The mat according to claim 10 wherein said bubble layers and said intermediate layer are dimensioned to provide the mat with a beveled perimeter.

16. A mat for decreasing musculoskeletal fatigue in humans during prolonged static postural stress comprising:
   a pair of bubble layers each having a flat side and a bubble side and being formed from an anti-static air bubble shaped closed cellular material;
   an intermediate layer selected from a group of materials consisting of closed cellular polyethylene foam material and closed cellular polypropylene foam material wherein said bubble sides of said bubble layers are positioned to face opposite sides of said intermediate layer;
   a base layer of a polyethylene carrier sheet having an upper surface and a lower surface and a low-tack adhesive carried on said lower surface;
   a removable liner releasably attached to said low-tack adhesive;
   a cover layer of anti-static closed cellular polypropylene foam material wherein said bubble layers and said intermediate layer are positioned between said base layer and said cover layer; and
   a laminating adhesive adhering said bubble layers, said intermediate layer, said base layer and said cover layer together.

17. The mat according to claim 16 wherein said bubble layers and said intermediate layer are dimensioned to provide the mat with a truncated pyramidal shape having a beveled perimeter.

18. The mat according to claim 16 wherein said bubble shaped material has less than a 10% thickness loss based on a 0.5 pounds per square inch loading over 15 days utilizing a static test method of 10"×10" material samples, said closed cellular polyethylene foam material of said intermediate layer has a density in a range of 1.7 to 2.2 pounds per cubic foot, and said polypropylene closed foam material of said cover layer has a density in a range of 0.5 to 0.7 pounds per cubic foot.

* * * * *